Patented July 22, 1924.

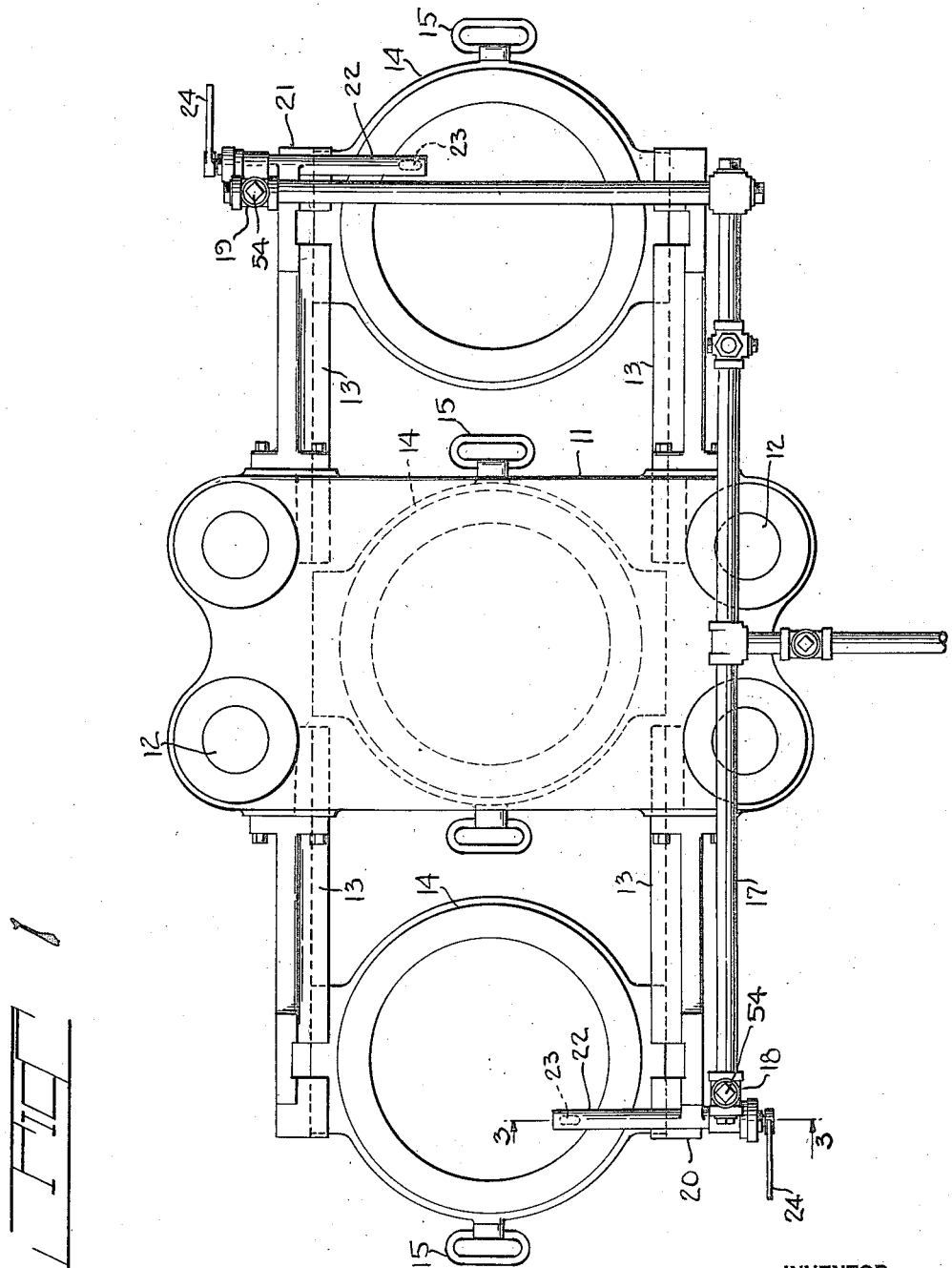

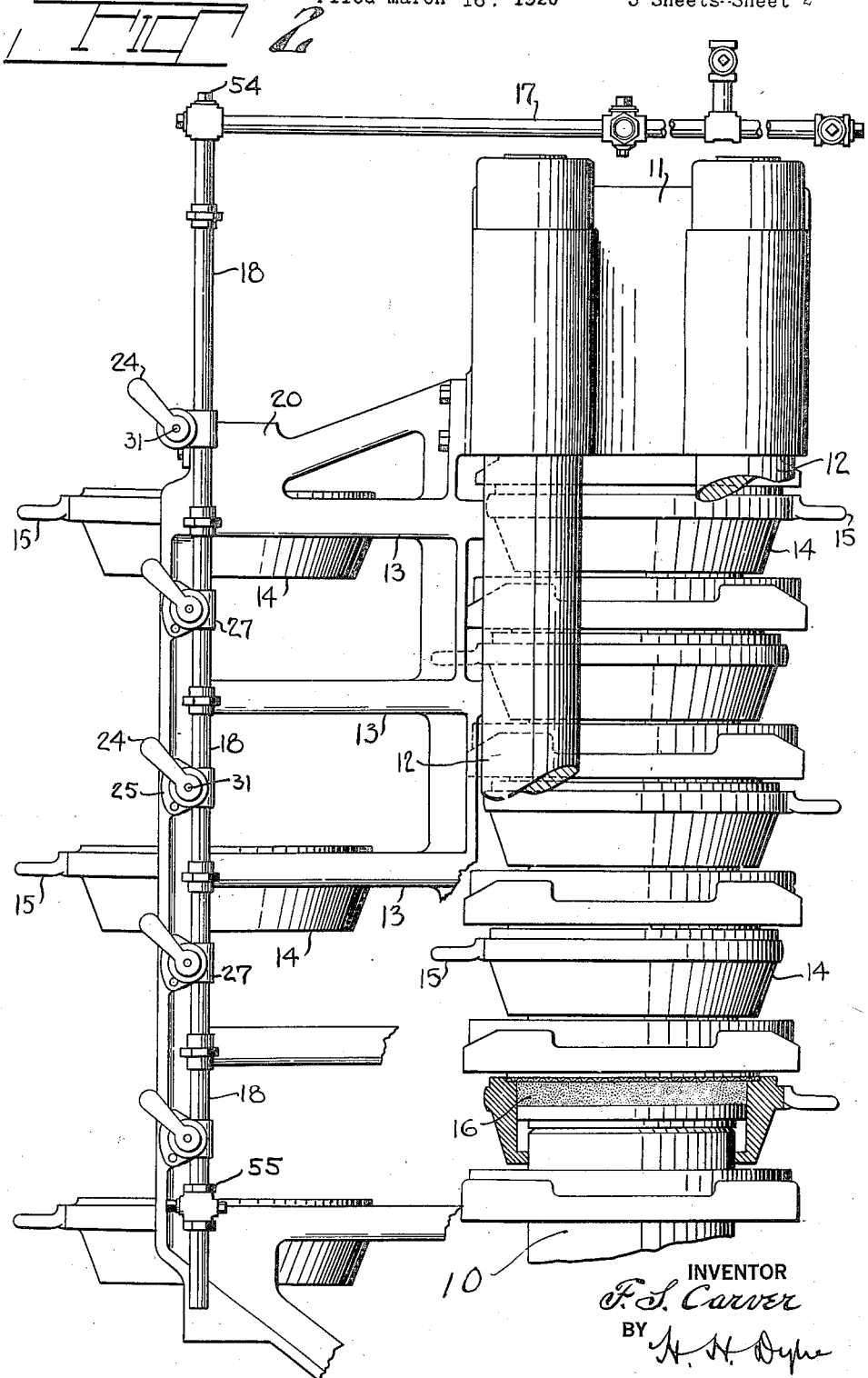

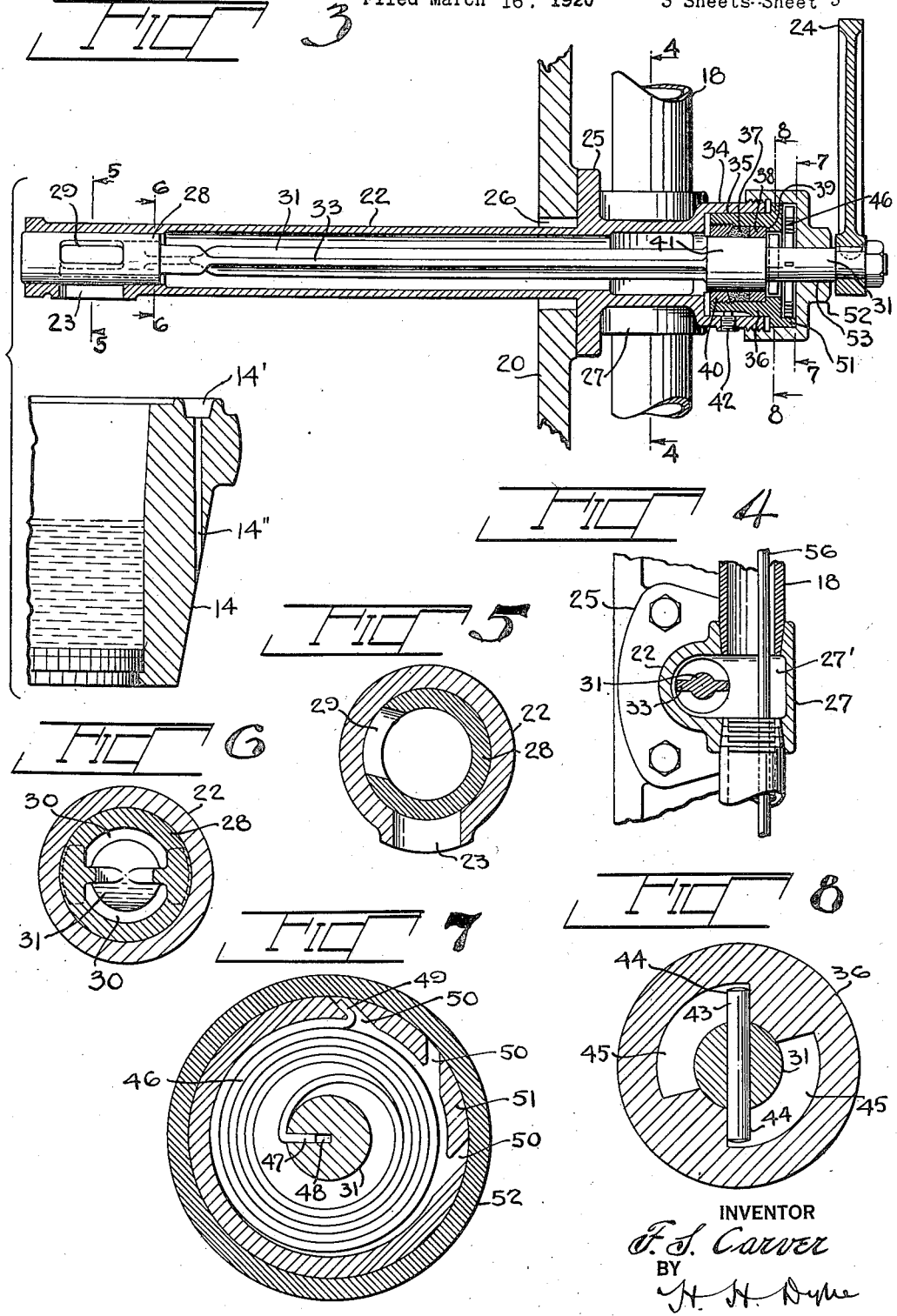

1,502,335

UNITED STATES PATENT OFFICE.

FRED S. CARVER, OF EAST ORANGE, NEW JERSEY.

FILLING APPARATUS FOR PRESSES.

Application filed March 16, 1920. Serial No. 366,364.

*To all whom it may concern:*

Be it known that I, FRED S. CARVER, a citizen of the United States, and a resident of East Orange, county of Essex, and State of New Jersey, have invented certain new and useful Improvements in Filling Apparatus for Presses, of which the following is a specification.

My invention relates to a filling apparatus for use in connection with presses. While applicable to presses for various materials, the invention finds a useful embodiment in cocoa presses, in which the ground cocoa bean material, in the form of thick, heavy liquid, is introduced into pots and subjected to hydraulic pressure, by means of which the fluid cocoa butter is separated from the solid cake or cocoa portion. The invention, however, may be used with other materials which are fluent or capable of being handled in a fluid, or semi-fluid condition.

A cocoa press equipped with a filling apparatus in accordance with my invention is shown herewith, but it is to be understood that the same is for illustration only and not for limitation of the invention.

In the drawings, Fig. 1 is a plan view of the press equipped with a filling apparatus in accordance with my invention. Fig. 2 is a fragmentary front view of the parts shown in Fig. 1, taken partly in section. Fig. 3 is a cross-sectional view of the preferred form of filling valve and showing its relation to the press pot to be filled at the time of filling the latter, and Figs. 4, 5, 6, 7 and 8 are cross-sectional views taken on the lines 4—4, 5—5, 6—6, 7—7 and 8—8 of Fig. 3.

In the press here illustrated a hydraulic piston 10 is forced upward toward the stationary press head 11, which is carried on the four posts 12, 12.

A series of runways or tracks 13, 13 extend out from the frame work so provided, and the pots 14, 14 for receiving the ground cocoa bean liquid are adapted to be slid in and out of the runways 13, 13. In the form shown the pressing means is centrally arranged and there are two sets of the runways, arranged on opposite sides of the press. The pots, 14, 14, may be moved in and out by any convenient means, as for example, they are manually manipulated by handles 15 provided for this purpose. The pans 14 have an annular groove 14', about their upper margins and outlets 14" for the discharge of the expressed cocoa butter. When the pans 14 are pushed inwardly over the press plunger 10, and exposed to the pressure thereof the fluid cocoa butter is extracted and the solid cake 16 of cocoa remains in the pan. When the pans are moved out along the runways 13, to the position shown at the extreme left in Fig. 2, after the cake of solid cocoa has been removed, the pans are filled with the ground cocoa bean material, after which they are again moved inwardly and are subjected to hydraulic pressure as before. When the arrangement of the press is as shown, with slide-ways, 13, for five pans 14, on each side, there are always five pans out ready for filling and five pans are in the press and subjected to pressure.

The present invention is concerned more especially with the filling of pots 14, while out of the pressing position and supported in the runways 13. For this purpose there is provided a main supply pipe or conduit 17, to which the ground cocoa bean material, or "chocolate liquor," is introduced under pressure in its form of a heavy, thick liquid mass. This supply pipe is provided with vertical branches, 18 and 19, which can be conveniently arranged alongside the upright frame members 20 and 21, on which the outer ends of the runways 13 are supported, and a series of laterally projecting discharge tubes 22 are extended, preferably horizontally from the vertically arranged branch pipes, 18 and 19, and are provided with discharge apertures 23, over the outermost locations of pots 14, on runways 13 and adapted to discharge thereinto, as shown in Fig. 3.

The discharge tubes 22, are supplied with preferably individual valves controlled by the handles 24, which extend outwardly beyond the branch pipes 18 and 19, where they are conveniently accessible for the press operator.

The discharge tubes 22, are preferably made by casting and are provided with a flange 25, by which they may be bolted or otherwise secured to the frame members 20, 21, the tubes 22 passing through openings 26 in such frame members.

The tubes 22 are provided with offset and chambered portions 27, in alignment with the branch pipes 18, 19, said branch pipes 18, 19, being preferably made up of sections screwed into threaded openings in said offset portions 27. The chambers 27' of members 27 thus form in effect, parts of the branch pipes 18, 19.

The valves 28 are hollow and have outlet openings 29, and passages 30, 30 (see Fig. 6) communicating with the hollow interior of valves 28, and also with the interior of the discharge tubes 22. When the valves 28 are turned so that discharge openings 29 therefor register with discharge apertures 23 of tubes 22, the liquid material is discharged therefrom into the pots 14.

The valve stems 31 of valves 28 extend substantially axially of the pipes 22 and are preferably provided with one or more laterally projecting webs or flanges 33. When the valve is turned such webs or flanges serve to break up the semi-solid mass of ground cocoa bean material within the tubes 22 and thus prevent clogging thereof. The webs 33 also preferably project to some extent at least within the chamber 27' which, as already stated forms substantially a continuation of the branch pipe sections 18 and 19 and serves to break up material lodging therein and to prevent clogging of material in the branch pipes as will be clear from Figs. 3 and 4.

The valves 28 are preferably held in closed position by appropriate spring devices and means are also preferably provided for preventing the passage of the liquid past the valve stem adjacent to the handle 24. In the form shown a portion of outlet tube 22 is extended beyond the pipes 18, 19 and is provided with a threaded extension 34, recessed on its interior, as shown at 35, and adapted to receive a stuffing box member 36, containing a packing ring 37, held in place against the ring 38, seated on the shoulder 39, by means of a screw threaded ring 40, and serving as a closure about the cylindrical portion 41, of the valve stem 31.

The stuffing box member 36, is held from turning in the recess 35 by any appropriate means, such as the screw 42. The rotative movement of the valve stem 31, is limited by means provided for that purpose, such as a pin 43, extending therethrough and having its projecting end portions 44, 44 received within the notched-out portions 45, 45 of the stuffing box member 36. With the end portions 44, 44 of pin 43, at one end of such notches 45, the valve 28 is in closed position, and at the opposite end of the movement of the valve, the same is in open position. The valve 28 is releasably held in the closed position by the coil spring 46, having a laterally projecting end portion 47, received in the notch 48, provided in the valve stem 31, and the turned-back portion 49, on its opposite end, received in the notches 50, 50 in the flange 51 of the stuffing box member 38. The provision of a plurality of notches 50, affords a ready means of adjusting the spring 46 to obtain any desired tension.

A cap 52, screw threaded on the extension 34, of discharge tube 22 and having an opening 53, for the passage of valve stem 31, encircles the stuffing box member 36, and serves, when screwed in place to hold the various parts together.

To remove the entire valve assembly from its housing, when removal is desired, as for cleaning or for other purposes, it is only necessary to unscrew cap 52 whereupon the entire valve assembly may be withdrawn complete and without disturbing the adjustment of its parts. The chocolate liquor freezes or solidifies at about 95 degree F. and, if not kept sufficiently heated, may solidify within the outlet tube or valve housing 22, particularly if the press is stopped and allowed to cool. On again starting, unless the pipes are heated by separate steam pipes, it may be necessary to remove the valve assembly and knock off any material adhering thereto, whereupon the valve may be replaced, leaving the housing clean for passage of the chocolate liquor. The flanges 33 serve, when the valve handle is turned, to free such solidified plug of material from the housing walls. Plugs 54 are preferably provided, in line with the branch pipes 18 and 19, and when same are removed a cleaning rod can be inserted and branch pipes 18 and 19 readily freed from obstructions. The valve 55 permits the pipe to be drained when the press is to be out of use for some time. Such valves are preferably straight through stop cocks adapted to permit the passage of the cleaning rod when same is inserted as described above. The valve stems 31, being offset from the axis of the branch pipes, leave the same free for passage of the material supplied and are out of the way of the pipe cleaning device when used as described. This design permits the provision, if desired, of small steam pipes for heating purposes, such as shown at 56, Fig. 4.

The operation of a press equipped with my improved filling apparatus will be clear from the foregoing. When the pots 14, are withdrawn from the action of the plunger 10, and the cake removed therefrom and the pots are ready to be refilled, it is only necessary to pull down on the handle 24, controlling the filling valve 28 for the particular pan and hold same down until a sufficient quantity of the filling material has been discharged thereinto through the supply pipe and valve. When a sufficient quantity has been introduced into the pot, the valve handle is released and the valve automatically closes. The valve 28 being located immediately at the discharge apertures, there is no dripping of material after the valve is closed, so that the apparatus is kept clean and free from undesirable deposits of the sticky chocolate liquor on its various parts.

The filled pots are pushed into place in the press, which is operated for the expression of the liquid cocoa butter therefrom, the pans being raised somewhat from their position within the runways 13, during such pressing action, as will be plain from Fig. 2. When the pressing operation is completed, the pans are lowered to their respective runways upon lowering the press plunger, whereupon they may be returned to their runways and pushed out to filling position as before. It will be seen that the provision of filling apparatus in accordance with the invention greatly simplifies the operation of such presses and reduces the labor attendant upon the operation, and that dripping or slopping of material around upon parts of the press is avoided, and that the operation of the valve serves automatically to prevent clogging of the fluid passages, and that if at any time it becomes necessary to remove the valves for cleaning out the pipes, or for other purposes, the entire assembly can be quickly and easily removed without any disturbance of the adjustment of the various parts. Changes and modifications from the embodiment of the invention shown may be resorted to within the scope of my claims without departing from my invention or sacrificing its advantages.

I claim:—

1. In a press the combination of press pots movable into filling and pressing positions, and valved means for simultaneously supplying fluent material to such pots while in filling position.

2. In a press the combination of a plurality of press pots, runways on which said pots are adapted to be run into and out of the press, and valved conduits adapted to supply fluent material for filling such pots simultaneously and located over the runways.

3. In a filling apparatus for filling press pots, a supply conduit, and a valve therefor and a valve stem extending within the conduit, and means on the valve stem and moving therewith for preventing clogging of the conduit.

4. In a press, a plurality of press pots, a series of runways located one above another and on which the pots are adapted to be moved in and out, and a corresponding plurality of valved means for supplying fluent material for filling the pots simultaneously, said valved means being located over their outermost stations on the runways for supplying material to each of said pans independently of the remaining pans.

5. In a press a series of runways, pots adapted to be run in and out on said runways, a supply conduit for fluent material extending over each runway and having a discharge outlet thereover, and means for opening and closing said outlet comprising a handle extending out beyond the runway.

6. In a press a series of runways, press pots adapted to be run in and out on said runways, press means adapted for moving said pots vertically when in their in positions, and separate valved filling means located over each of said runways for supplying fluent material to all of said pots simultaneously when in out position.

7. In a press, centrally located pressing means, a plurality of series of runways extending in and out from the pressing means, pots adapted to be run in and out on the runways, a conduit for supplying material under pressure for filling said pots and having a plurality of series of outlets therefor arranged over the runways, and valves for controlling said outlets.

8. Filling apparatus for press pots comprising a conduit to which semi-liquid material is supplied under pressure, a branch extending laterally from said conduit, and a valve in said branch and controlling an outlet therefrom, said valve being arranged to turn axially within said branch pipe.

9. In a press, centrally located pressing means, runways extending out on opposite sides of said pressing means, press pots adapted to be run in on said runways to pressing position and out thereon to filling position, a conduit for supplying material under pressure for filling said pots, lateral branches of said conduit extending over the pots when in filling position and provided thereat with discharge openings, valves for controlling the discharge openings, and handles for manipulating the valves extending outwardly beyond the runways.

10. In a filling apparatus for press pots and the like, a conduit, a branch outlet tube connected thereto, and a valve for the outlet tube comprising a member extending into the conduit and adapted when the valve is operated to break up any clogged material in the adjacent portion of the conduit.

11. In filling apparatus for press pots and the like, a supply conduit, an outlet tube extending at substantially a right angle therefrom, a valve in said outlet tube, and a valve stem extending axially of said tube and having its outer end projecting beyond said conduit.

12. In filling apparatus for press pots and the like, a valve housing comprising a valve tube and a lateral chambered extension, a supply conduit comprising pipes connected to said extension on opposite sides whereby said chambers form a portion of the conduit, and a valve in said valve tube and having a stem extending out through the valve housing.

13. In filling apparatus for supplying fluent material to press pots and the like, a conduit, a branch tube extending therefrom at substantially a right angle and offset from the axis of the conduit, and a valve for the branch tube extending therefrom out beyond the conduit, whereby the conduit is substantially continuous and is uninterrupted by the valve for the branch tube.

14. In filling apparatus for supplying fluent material to press pots and the like, a supply pipe, a series of branch outlet pipes extending at substantially right angles therefrom, valves for the branch pipes having valve stems arranged axially therein, and offset connections between the supply pipe and the branch pipes, whereby the valve stems are out of line with the axis of the supply pipe.

In testimony that I claim the foregoing, I hereto set my hand, this 9th day of March, 1920.

FRED S. CARVER.